(12) United States Patent
Akdogan et al.

(10) Patent No.: US 12,103,989 B2
(45) Date of Patent: Oct. 1, 2024

(54) PRODUCTION OF POLYMERIC MATERIAL WHICH CAN BE CURED RAPIDLY BY MEANS OF THE EFFECT OF ULTRAVIOLET (UV) RAYS

(71) Applicants: BAHCESEHIR UNIVERSITESI, Istanbul (TR); PIRI REIS UNIVERSITESI, Istanbul (TR)

(72) Inventors: Ozan Akdogan, Istanbul (TR); Pelin Erkoc Erik, Istanbul (TR); Nilay Gunduz Akdogan, Istanbul (TR)

(73) Assignees: BAHCESEHIR UNIVERSITESI, Istanbul (TR); PIRI REIS UNIVERSITESI, Istanbul (TR)

( * ) Notice: Subject to any disclaimer, the term of this patent is extended or adjusted under 35 U.S.C. 154(b) by 544 days.

(21) Appl. No.: 17/607,906

(22) PCT Filed: Feb. 28, 2020

(86) PCT No.: PCT/TR2020/050163
§ 371 (c)(1),
(2) Date: Nov. 1, 2021

(87) PCT Pub. No.: WO2020/222709
PCT Pub. Date: Nov. 5, 2020

(65) Prior Publication Data
US 2022/0220236 A1     Jul. 14, 2022

(30) Foreign Application Priority Data
May 2, 2019   (TR) ................................ 2019/06545

(51) Int. Cl.
*C08F 2/46*     (2006.01)
*C08F 2/50*     (2006.01)
*C08F 136/22*   (2006.01)
*C08G 61/04*    (2006.01)
*C08K 5/17*     (2006.01)
*C08K 5/3415*   (2006.01)
*C08K 5/53*     (2006.01)

(52) U.S. Cl.
CPC .............. *C08F 136/22* (2013.01); *C08K 5/17* (2013.01); *C08K 5/3415* (2013.01); *C08K 5/53* (2013.01)

(58) Field of Classification Search
CPC .......... C08K 5/17; C08K 5/3415; C08K 5/53; C08F 222/103; C08F 2/50; C08F 136/22; C08F 226/10; C08L 33/08
USPC ................. 522/64, 6, 71, 189, 184, 1; 520/1
See application file for complete search history.

(56) References Cited

U.S. PATENT DOCUMENTS 7,304,095 B2 *  12/2007  Masumi .................... B41J 2/515
                                                      522/74
9,334,423 B2    5/2016   Tobing et al.

FOREIGN PATENT DOCUMENTS

WO         2018219729 A1     12/2018

* cited by examiner

*Primary Examiner* — Jessica Whiteley
(74) *Attorney, Agent, or Firm* — Bayramoglu Law Offices LLC

(57) ABSTRACT

A production of polymer material realized at low energy and with rapid curing process for providing advantages mentioned in the specification. The polymer material is aimed to be used as a resin material for three-dimensional (3D) printers and as a filling substance to be added into another material for increasing hardness, as a nano/micro-particle production material, as an ink for printing, and as a press, mold and surface coating material.

8 Claims, No Drawings

PRODUCTION OF POLYMERIC MATERIAL WHICH CAN BE CURED RAPIDLY BY MEANS OF THE EFFECT OF ULTRAVIOLET (UV) RAYS

CROSS REFERENCE TO THE RELATED APPLICATIONS

This application is the national stage entry of International Application No. PCT/TR2020/050163, filed on Feb. 28, 2020, which is based upon and claims priority to Turkish Patent Application No. 2019/06545 filed on May 2, 2019, the entire contents of which are incorporated herein by reference.

TECHNICAL FIELD

The present invention relates to production of a polymer material having rapidly curing characteristic by means of the effect of ultraviolet ray.

BACKGROUND

Polymers are formed by arranging pluralities of molecules, called monomers, in a sequenced manner. Most of the polymers are formed by arranging a single type of monomer. Some of them can be formed by bringing together two or three monomer types. The characteristic properties of polymers are their low density, low resistance and high mechanical dampening. Polymers cannot generally show resistance against low and high temperatures and they are used at room temperatures.

Ultraviolet (UV) waves have shorter wavelength when compared with visible light. Human eye cannot see these wavelengths. Scientists have separated the ultraviolet part of the spectrum into three; this classification can also be applied by physicists in the same manner as near UV (320-400 nm), middle UV (200-320 nm) and vacuum UV (10-200 nm).

When photo-polymers are subjected to light energy, they enter into chemical reaction and their mechanical and chemical structure changes. Photo-polymers are activated in lights with different wavelengths with respect to their types. Moreover, the amount of energy, to which is being subjected depending on the power and duration of light, changes the cure level.

In systems which cure by means of ultraviolet rays, UV rays are used for initiating polymerization. The reaction formed by UV rays provides transformation of a liquid system into a solid system having characteristics like rubber or glass at room temperature and within a few seconds. The coating passed through the conveyor with adjustable speed and where UV lamps exist is cross bonded within a few seconds and is transformed into a structure which is completely hardened. All reactive components, existing in systems which can be hardened by UV, enter into reaction and they exist in the web structure of the polymer. There is no solvent in such coating formulations. In their compositions, there are photo-initiators, monomers (for cross binding), filling substances and various additive substances. Among the advantages of photo-polymers which are cured by UV rays; rapid production is provided since the cross bonded structure is formed in a very rapid manner (thanks to this, the stacking ability also increases), they have low investment and production costs, they do not comprise volatile organic solvent which is harmful for the environment and for the health, and they can be applied at room temperature and they have a wide application area.

The basic components forming the protective coating formulations prepared by means of UV rays are reactive oligomers or monomers and photo-initiators. At the same time, additive chemicals (rheology agents, foam eliminators, dispersants, surface regulators, etc.) are added for providing different characteristics to the coating, and fillings (in systems with pigment) are added for decreasing cost.

There are two problems which must be overcome in industrial systems where polymer production is realized in big scales. These difficulties are primarily the insufficient heat transfer and high viscosity. These difficulties are eliminated by applying different polymerization methods where the characteristics of polymerization medium are changed.

One of the problems faced in the prior art is the usage of solvent for polymerization processes. Since solvent usage dilutes polymerization medium, it provides decrease of viscosity. However, the removal of the solvent is costly and difficult.

One of the other problems faced in the prior art is the need for high energy light source for realization of curing. This problem leads to curing process to have higher-cost.

The problems like susceptibility of photo-initiators and/or monomers to medium conditions and deteriorating thereof rapidly are important for the selection of the beginning materials.

As a result, because of all of the abovementioned problems, an improvement is required in the related technical field.

SUMMARY

The present invention relates to production of a polymer material having rapid curing characteristic by means of the effect of ultraviolet rays, for eliminating the above mentioned disadvantages and for bringing new advantages to the related technical field.

The main object of the present invention is to provide a polymer material which has curing process characteristic in short time.

Another object of the present invention is to provide a polymer material which can be used as additive (filling) material or main material in three-dimensional printers.

Another object of the present invention is to provide a polymer material which needs low energy light source for realization of the curing process.

Another object of the present invention is to provide a process where photo-initiator molecules, which are not affected by the oxygen existing in medium conditions, are used.

In order to realize the abovementioned objects and the objects which are to be deducted from the detailed description below, the present invention is production of polymer material having rapidly curing characteristic by means of the effect of ultraviolet (UV) ray. Accordingly, in order to provide obtaining said polymer, said production method is characterized by comprising the steps of:

i. Dissolving the photo-initiator material in water in order for the photo-initiator material to form solution with the polymer, ii. Dissolving the photo-initiator, dissolved in water, inside monomer, iii. Adding co-initiator and accelerator to the photo-initiator-monomer solution dissolved in monomer, iv. Forming cross-bonds by realizing curing process of polymer beginning solution in ultraviolet device.

In a preferred embodiment of the present invention, the photo-initiator is lithium phenyl-2,4,6-trimethylbenzoylphosphinate (called LAP in the literature). Thus, a polymer material which can be cured rapidly is obtained.

In another preferred embodiment of the present invention, the photo-initiator dissolved in water is distributed and cured in a monomer which is not water-based.

In another preferred embodiment of the present invention, the monomer is pentaerythritol triacrylate (called PETA or PETIA in the literature) molecule. Thus, a polymer material which can be cured rapidly is obtained.

In another preferred embodiment of the present invention, the proportion of photo-initiator and pentaerythritol triacrylate monomer in said polymer prior solution is between 0.001% and 0.0002% by weight.

In another preferred embodiment of the present invention, electron donor triethanolamine (it is called TEA in the literature) molecules are added into said monomer-photo-initiator solution as co-initiator with proportions of 0.05% by weight.

In another preferred embodiment of the present invention, 1-vinyl-2 pyrrolidinone (called NVP or VP in the literature) monomers are added as accelerator with proportion of 0.03% by weight to said monomer-photo-initiator solution.

Thus, TEA and LAP photo-initiator stimulated by means of UV ray are activated and provide formation of radicals from PETA and NVP monomers and provide beginning of curing.

In another preferred embodiment of the present invention, in order to realize curing process of the beginning solution, the wavelength of light is between 365 and 400 nanometers.

In another preferred embodiment of the present invention, in order to realize curing process of the beginning solution, the energy of light is between 3 and 5 watts.

In another preferred embodiment of the present invention, in order to obtain polymer material, the curing process is completed between 1 and 2 seconds.

The obtained polymer material is dried at room temperature and is taken to the covered glass bottle for the following uses and is stored at +4° C.

DETAILED DESCRIPTION OF THE EMBODIMENTS

In this detailed description, the subject matter production of polymer material, having rapid curing characteristic by means of the effect of ultraviolet (UV) ray, is explained with references to examples without forming any restrictive effect only in order to make the subject more understandable.

The polymerization reactions initiated by means of ultraviolet light are called photo-polymerization. In general, ultraviolet or visible region light sources are used. The reactive types, formed as a result of light absorption by the photo-initiator at a suitable wavelength, provide polymerization of single function monomers and provide transformation of multi-functional monomers into cross-bonded structures. Recently, since photo-initiated polymerization brings together various economical and ecologic expectations, it substantially attracts attention. Photo-initiated polymerization forms the base of various applications like coating, ink, press plates, magnetic composites, optic frequency guides and microelectronic thanks to the excellent advantages thereof. It provides advantages like high polymerization speed at room temperature, low energy consumption, polymerization without using solvent, controlling the surface area to be applied and controlling the application duration.

The subject of the present invention is to provide production of polymer material realized at low energy and with rapid curing process in order to provide the abovementioned advantages. The obtained polymer material is aimed to be used as resin material for three-dimensional (3D) printers and as a filling substance which can be added to another material for increasing hardness, as nano/micro-particle production material, as ink for printing, as press, mold and surface coating material.

The preferred embodiment of the invention comprises at least one monomer, at least one photo-initiator and/or co-initiator and/or accelerator for production of polymer material by means of UV curing process.

In the preferred embodiment of the invention, as monomer (the smallest unit which forms a very long polymer structure by coming together), pentaerythritol triacrylate (it will be called PETA) described in Formula 1 is used.

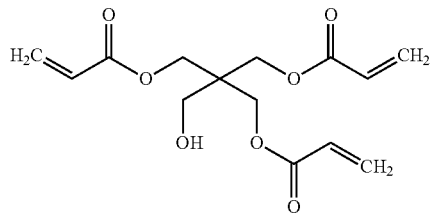

Formula I

The primer radicals, formed as a result of light absorption of the photo-initiator at a suitable wavelength, transform multi-functional acrylates into cross-bonded structures. The efficiency of the photo-initiator system relates to the following characteristics of the photo-initiator: UV absorption characteristic, radical formation and efficiency of contribution of the radical to the monomer, being odorless and non-poisonous and having good storage characteristic. In the preferred embodiment of the present invention, as the photo-initiator, lithium phenyl-2,4,6-trimethylbenzoylphosphinate molecule (hereafter it will be called LAP) described in Formula 2 is used.

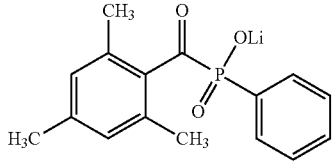

Formula 2

In the preferred embodiment of the invention, as the co-initiator, triethanolamine (hereafter it will be called TEA) described in Formula 3 is used. Electron transfer is realized through TEA and alpha-amino radicals are formed. This activated molecule provides formation of the radicals of monomers and provides initiation of polymerization.

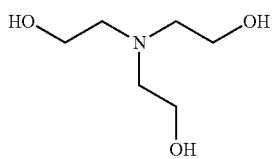

Formula 3

In the preferred embodiment of the invention, as the accelerator, 1-vinyl-2 pyrrolidinone (hereafter it will be called NVP) monomer described in Formula 4 is used. It provides acceleration of the polymerization reaction.

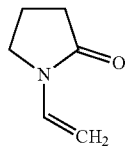

Formula 4

The present invention relates to polymer material production method by applying ultraviolet curing process by using together the mixture of at least one prryolidone as accelerator and/or triethanolamine as co-initiator and/or molecule comprising at least one acrylate group as monomer and molecule comprising at least one phosphinate group as photo-initiator. Accordingly, in order to provide obtaining of said polymer, said production method comprises the following steps respectively.

i. Dissolving the photo-initiator material in water beforehand in order for the photo-initiator material to form solution with the monomer,
  ii. Dissolving the photo-initiator, dissolved by water, inside monomer,
  iii. Adding co-initiator and accelerator to the photo-initiator-monomer solution dissolved in monomer,
  iv. Realizing the curing process of the polymer beginning solution in ultraviolet device,
  v. Drying the obtained polymer after the curing process ends.

In step (i), the photo-initiator is LAP molecule.

In step (i), the amount of photo-initiator in the distilled water is between 7.33% and 1.46% by weight.

In step (ii), the monomer, which is needed for production of polymer material, is PETA molecule.

In step (ii), the weight proportion of the photo-initiator in the monomer is between 0.002% and 0.0002% by weight.

In step (iii), the co-initiator, added to the monomer-photo-initiator solution, is TEA molecule.

In step (iii), the amount of TEA molecule, provided as co-initiator, in the monomer-photo-initiator solution is 0.05% by weight.

In step (iii), the accelerator added to the monomer-photo-initiator solution is NVP molecule.

In step (iii), the amount of NVP molecule, provided as accelerator, in the monomer-photo-initiator solution is 0.03% by weight.

In step (iv), in order to realize curing process of the polymer beginning solution, the wavelength of light is between 365 and 400 nanometers.

In step (iv), in order to realize curing process of the polymer beginning solution, the energy of light is between 3 and 5 watts.

In step (iv), the curing process is completed between 1 and 2 seconds for realizing the curing process of the polymer beginning solution.

The protection scope of the present invention is set forth in the annexed claims and cannot be restricted to the illustrative disclosures given above, under the detailed description. It is because a person skilled in the relevant art can obviously produce similar embodiments under the light of the foregoing disclosures, without departing from the main principles of the present invention.

What is claimed is:

1. A production method of a polymer material having rapidly curing characteristic by an effect of an ultraviolet (UV) ray without needing a high-energy light source and having a low toxicity value, comprising the following steps of:
  i. dissolving photo-initiator lithium phenyl-2,4,6-trimethylbenzoylphosphinate in water to obtain a water-lithium phenyl-2,4,6-trimethylbenzoylphosphinate solution,
  ii. adding monomer pentaerythritol triacrylate to the water-lithium phenyl-2,4,6-trimethylbenzoylphosphinate solution to obtain a photo-initiator-monomer solution,
  iii. adding triethanolamine and 1-vinyl-2 pyrrolidinone to the photo-initiator-monomer solution, wherein the triethanolamine functions as a co-initiator, and the 1-vinyl-2 pyrrolidinone functions as an accelerator,
  iv. applying curing processes of a polymer beginning solution in an ultraviolet radiation region.

2. The production method according to claim 1, wherein in step (i), an amount of the photo-initiator lithium phenyl-2,4,6-trimethylbenzoylphosphinate in water is between 1.46% and 7.66% by weight.

3. The production method according to claim 1, wherein in step (ii), an amount of the photo-initiator lithium phenyl-2,4,6-trimethylbenzoylphosphinate is at a value between 0.0002% and 0.002% by weight with respect to an amount of a monomer component.

4. The production method claim 1, wherein in step (iii), an amount of the triethanolamine, provided as the co-initiator, in the photo-initiator-monomer solution is 0.05% by weight.

5. The production method according to claim 1, wherein in step (iii), an amount of the 1-vinyl-2 pyrrolidinone, provided as the accelerator, in the photo-initiator-monomer solution is 0.03% by weight.

6. The production method according to claim 1, wherein in step (iv), in order to realize the curing processes of the polymer beginning solution, a wavelength of light is applied at a value between 365 and 400 nanometers.

7. The production method according to claim 1, wherein in step (iv), in order to realize the curing processes of the polymer beginning solution, an energy of light is applied at a value between 3 and 5 watts.

8. The production method according to claim 1, wherein in step (iv), the curing processes are completed between 1 and 2 seconds for realizing the curing processes of the polymer beginning solution.

* * * * *